US012453672B2

(12) United States Patent
Pierri et al.

(10) Patent No.: US 12,453,672 B2
(45) Date of Patent: Oct. 28, 2025

(54) EQUIPMENT FOR PASSIVE MOVEMENT OF THE KNEE JOINT

(71) Applicant: BIOMOTION INDÚSTRIA E COMÉRCIO DE EQUIPAMENTOS PARA REABILITAÇÃO LTDA, Florianópolis (BR)

(72) Inventors: Carlos Alberto Atherinos Pierri, Florianópolis (BR); Daniel Dezan de Bona, Florianópolis (BR); Marcelo Peduzzi de Castro, Florianópolis (BR)

(73) Assignee: BIOMOTION INDÚSTRIA E COMÉRCIO DE EQUIPAMENTOS PARA REABILITAÃO LTDA, Florianópolis (BR)

( * ) Notice: Subject to any disclaimer, the term of this patent is extended or adjusted under 35 U.S.C. 154(b) by 693 days.

(21) Appl. No.: 17/794,674

(22) PCT Filed: Jan. 25, 2021

(86) PCT No.: PCT/BR2021/050038
§ 371 (c)(1),
(2) Date: Jul. 22, 2022

(87) PCT Pub. No.: WO2021/146790
PCT Pub. Date: Jul. 29, 2021

(65) Prior Publication Data

US 2023/0102351 A1 Mar. 30, 2023

(30) Foreign Application Priority Data

Jan. 23, 2020 (BR) ...................... 10 2020 001512 5

(51) Int. Cl.
*A61H 1/02* (2006.01)

(52) U.S. Cl.
CPC ..... *A61H 1/024* (2013.01); *A61H 2201/0103* (2013.01); *A61H 2201/1207* (2013.01);
(Continued)

(58) Field of Classification Search
CPC .. A61H 1/00; A61H 1/005–02; A61H 1/0237; A61H 1/024;
(Continued)

(56) References Cited

U.S. PATENT DOCUMENTS 4,603,687 A 8/1986 Greenwood
4,665,899 A 5/1987 Farris et al.
(Continued)

FOREIGN PATENT DOCUMENTS

BR PI10157913 4/2010
BR PI1015791 1/2017
(Continued)

OTHER PUBLICATIONS

International Search Report for PCT/BR2021/050038 dated Jan. 25, 2021.
(Continued)

*Primary Examiner* — Rachel T Sippel
(74) *Attorney, Agent, or Firm* — B. Aaron Schulman, Esq.; Stites & Harbison, PLLC

(57) ABSTRACT

The present patent document relates to automatic equipment for performing orthopedic and physiotherapeutic procedures for passive motion of the knee joint (patellofemoral and tibiofemoral), incorporating three motion units: knee flexion and extension motion unit; internal and external rotation motion unit of the knee; and a multidirectional patellar mobilization unit (lower-upper and medial-lateral), an external support for multidirectional patellar mobilizer and a control unit. The flexion and extension motion unit is comprised of a mechanical and electronic structure on which
(Continued)

Figure 1:
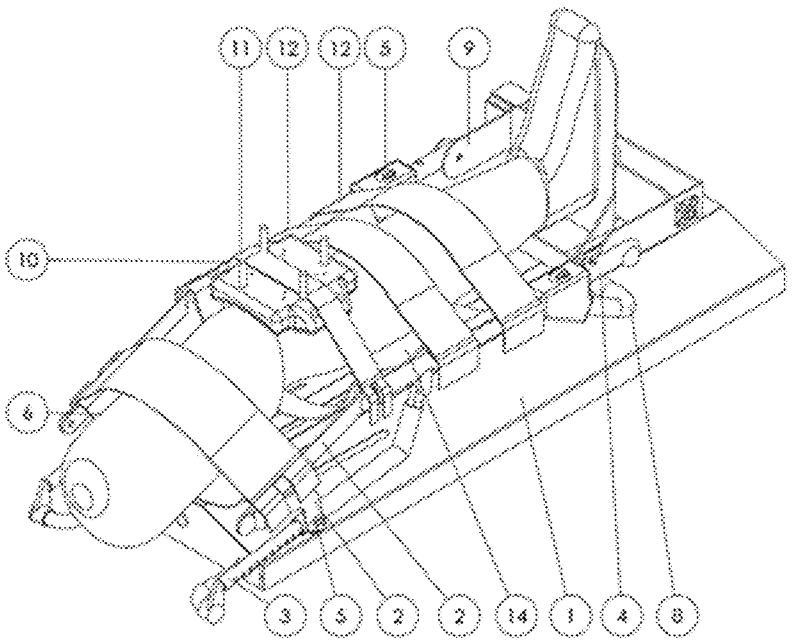

the leg rests during use thereof and has at least two supports for supporting the leg located in the back region of the thigh and in the back region of the leg (calf); the internal and external rotation motion unit of the knee is comprised of a structure with a support for the leg and a support for the foot region (sole region) coupled to a knee flexion and extension motion unit; and the multidirectional patellar mobilization unit is comprised of a receptacle on which a retainer and an actuating element are disposed.

1 Claim, 6 Drawing Sheets

(52) U.S. Cl.
CPC ................ *A61H 2201/1409* (2013.01); *A61H 2201/1642* (2013.01)

(58) Field of Classification Search
CPC .... A61H 2001/0203–0207; A61H 2201/0103; A61H 2201/1207; A61H 2201/1409; A61H 2201/164–1642; A61H 2201/1671–1676; A61H 2201/5053–5056; A61H 2203/0437; A61H 2203/045–0456; A61H 2205/102–104
See application file for complete search history.

(56) References Cited

U.S. PATENT DOCUMENTS

| | | | |
|---|---|---|---|
| 5,228,432 A | 7/1993 | Kaiser et al. | |
| 5,325,849 A | 7/1994 | Rugo | |
| 9,125,789 B2 | 9/2015 | Garcia | |
| 10,420,691 B2 | 9/2019 | Stewart | |
| 2006/0064044 A1 | 3/2006 | Schmehl | |
| 2012/0232438 A1 | 9/2012 | Cataldi et al. | |
| 2014/0094721 A1 | 4/2014 | Diallo | |
| 2020/0375773 A1 * | 12/2020 | Verma | A61F 13/061 |

FOREIGN PATENT DOCUMENTS

| | | |
|---|---|---|
| EP | 2114322 | 4/2016 |
| EP | 2825139 | 5/2016 |

OTHER PUBLICATIONS

Written Opinion of the International Searching Authority for PCT/BR2021/050038 dated May 11, 2021.
Anwer, Shahnawaz et al. Effects of orthopaedic manual therapy in knee osteoarthritis: a systematic review and meta-analysis. Physiotherapy, [S.L.], v.104, n.3,p. 264-276, set.2018.ElsevierBV. http://dx.doi.org/10.1016/j.physio.2018.05.003.
Courtney, Carol A. et al. Joint Mobilization Enhances Mechanisms of Conditioned Pain Modulation in Individuals With Osteoarthritis of the Knee. Journal of Orthopaedic & Sports Physical Therapy, [S.L.], v. 46, n. 3, p. 168-176, Mar. 2016. Journal of Orthopaedic & Sports Physical Therapy (JOSPT). http://dx.doi.org/10.2519/jospt.2016.6259.
Deyle et al. Physical therapy treatment effectiveness for osteoarthritis of the knee: a randomized comparison of supervised clinical exercise and manual therapy procedures versus a home exercise program. Research Report: Physical Therapy, [s. l], v. 85, n. 12, p. 1301-1317, Dec. 2005.
Deyle, Gail D. et al. Effectiveness of Manual Physical Therapy and Exercise in Osteoarthritis of the Knee. Annals of Internal Medicine, [S.L.], v. 132, n. 3, p. 173, Feb. 1, 2000. American College of Physicians. http://dx.doi.org/10.7326/0003-4819-132-3-200002010-00002.
Harrison, Benjamin et al. The relationship between isokinetic performance of hip and knee and jump performance in university rugby players. Isokinetics and Exercise Science, [S.L.], v. 21, n. 2, p. 175-180, May 20, 2013. IOS Press. http://dx.doi.org/10.3233/ies-130496.
Mullaney, Michael J.; Fukunaga, Takumi. Current Concepts and Treatment of Patellofemoral Compressive Issues. The International Journal of Sports Physical Therapy, New York, Usa, v. 11, n. 6, p. 891, Dec. 2006.
Ota et al. Comparison of Patellar Mobility in Female Adults With and Without Patellofemoral Pain. Journal of Orthopaedic & Sports Physical Therapy, [s. l], v. 38, n. 7, p. 396-402, Jul. 2008.
Reinold, Michael M.; Wilk, Kevin E.; Macrina, Leonard C.; Dugas, Jeffrey R.; Cain, E. Lyle. Current Concepts in the Rehabilitation Following Articular Cartilage Repair Procedures in the Knee. Journal of Orthopaedic & Sports Physical Therapy, [S.L.], v. 36, n. 10, p. 774-794, Oct. 2006. Journal of Orthopaedic &Sports Physical Therapy (JOSPT). http://dx.doi.org/10.2519/jospt.2006.2228.
Tyler, Timothy F.; Lung, Jennifer Y. Rehabilitation following osteochondral injury to the knee. Current Reviews in Musculoskeletal Medicine, [S.L.], v. 5, n. 1, p. 72-81, Jan. 28, 2012. Springer Science and Business Media LLC. http://dx.doi.org/10.1007/s12178-011-9108-5.
Wilk, Kevin E.; Davies, George J.; Mangine, Robert E.; Malone, Terry R . . . Patellofemoral Disorders: a classification system and clinical guidelines for nonoperative rehabilitation. Journal of Orthopaedic & Sports Physical Therapy, [S.L.], v. 28, n. 5, p. 307-322, Nov. 1998. Journal of Orthopaedic & Sports Physical Therapy (JOSPT). http://dx.doi.org/10.2519/jospt.1998.28.5.307.
Wilk, Kevin E.; Macrina, Leonard C.; Reinold, Michael M . . . Rehabilitation following Microfracture of the Knee. Cartilage, [S.L.], v. 1, n. 2, p. 96-107, Mar. 19, 2010. Sage Publications. http://dx.doi.org/10.1177/1947603510366029.
Office Action dated Oct. 3, 2023 in corresponding Canadian Application No. 3,165,349.

* cited by examiner

EQUIPMENT FOR PASSIVE MOVEMENT OF THE KNEE JOINT

The present patent document relates to automatic equipment for performing orthopedic and physiotherapeutic procedures for passive motion of the knee joint (patellofemoral and tibiofemoral).

The knee is formed by two joint surfaces, the patellofemoral joint and the medial and lateral tibiofemoral joint. The patellofemoral joint is formed by the frontal and distal joint surface of the femur, called trochlea and by the kneecap, which encases into and slides along the trochlea. In this joint there are lower-upper and medial-lateral displacement motions. The tibiofemoral joint is formed by the distal end of the femur and by the proximal end of the tibia. In this joint there are three pairs of motions, the flexion and extension (sagittal plane; medial-lateral axis of the knee), the internal and external rotation (transverse plane; axial or longitudinal axis) and the varus and valgus (frontal plane; anteroposterior axis). During knee motions, there is a combination of these joint displacements. For example, during extension of the knee (putting the leg straight), the external rotation of the knee and the upper sliding of the kneecap occur simultaneously.

The knee is a joint with high incidence of lesions, and among the treatment possibilities, multidirectional patellar mobilization is a frequently indicated therapeutic conduct. There are three procedures commonly used in clinical practice for recovery of the knee function: Immobilization, Motion or Passive Mobilization, and active Motion. Immobilization is necessary in some initial treatment phases, where, due to state of tissue healing, there can be no joint motion.

The motion or passive mobilization relates to the procedures applied to the patient while he/she is at rest, that is, the motion is performed by the physiotherapist or by means of an external device. The term passive motion is used when greater amplitudes are used, for example, flexion and extension of the knee. Whereas the term passive mobilization refers to motions of lesser joint amplitude, such as patellar sliding. Lastly, active motion relates to the motion performed actively by the patient, where the main objective is to produce motion by means of muscular contraction performed actively by the patient.

The passive tibiofemoral motion and patellar mobilization are therapeutic procedures classified in the clinical ambit as manual therapy technique, and are commonly recommended and applied during rehabilitation. Several studies have presented a series of clinical benefits after applying manual therapy, including patellar mobilization and passive tibiofemoral motion, in patients with dysfunctions in the knee (Anwer, Alghadir, Zafar, & Brismee, 2018; Deyle et al., 2005; Deyle et al., 2000). For example, two clinical assays (prospective monitoring study with two random intervention groups) showed that the use of manual therapy associated to exercise presents greater decrease of pain in the knee and functional improvement when compared to two different intervention approaches: placebo ultrasound (Deyle et al., 2000) and home exercise program (Deyle et al., 2005).

A systematic review accompanied by meta-analysis (Anwer et al., 2018), comprising 494 patients with knee osteoarthrosis showed advantages of intervention with manual therapy compared to intervention exclusively with exercise. The patients who received only manual therapy presented in the short term greater reduction in pain, improvement in function and physical performance compared to the exercise group. Patellar mobilization and passive tibiofemoral motion were among the procedures most emphasized (Anwer et al., 2018).

Patellar mobilization and passive tibiofemoral motion are among procedures most recommended for treating patients with pain in the knee associated to hypo-patellar and tibiofemoral mobility (Mullaney & Fukunaga, 2016). These motions are typically applied by the physiotherapist. However, some of the components of the patellar mobilization can be taught to the patient to be performed at home. Patellar self-mobilization appears to be an effective method since it allows a high dose of patellar mobilization, performed by the very patient (Mullaney & Fukunaga, 2016). The kneecap is moved as far as the restriction region and oscillatory motions or pressure maintained are applied (Mullaney & Fukunaga, 2016). Passive tibiofemoral motion is harder for the patient to be able to perform alone at home. One option is to teach family members. But both patellar mobilization and passive tibiofemoral motion are hard to perform at home, chiefly due to the presence of pain, insecurity and the technique which is hard to understand.

One of the main concerns after surgical intervention in the knee is the decrease in patellar and tibiofemoral mobility (Harrison et al., 2013; Wilk, Macrina, & Reinold, 2010). On average, a kneecap moves 1 cm medially (confidence interval of 95% from 0.8 cm to 1.4 cm) and 1.2 cm laterally (confidence interval of 95% from 0.7 cm to 1.8 cm) (Ota, Nakashima, Morisaka, Ida, & Kawamura, 2008). The reduction of patellar mobility is associated with excessive proliferation of healing tissue (arthrofibrosis) and adherence between different tissue layers (Wilk et al., 2010). As a consequence, there is a decrease in the amplitude of tibiofemoral motion of the knee and decrease in the recruitment ability of the muscles of the quadriceps, essential conditions for adequate functioning of the knee joint.

The patellar mobilization and the passive tibiofemoral motion are considered the main therapeutic procedures in the sense of avoiding hypo-patellar mobility and decreasing the amplitude of motion of the knee (Reinold, Wilk, Macrina, Dugas, & Cain, 2006; Tyler & Lung, 2012; Wilk, Davies, Mangine, & Malone, 1998; Wilk et al., 2010). Emphasis should be placed on the patellar mobilization to be performed in all the directions (lower, upper, medial and lateral), so that the passive tibiofemoral motion is performed up to the maximum amplitude available, and in high doses, covering the application several times per day (Reinold et al., 2006; Tyler & Lung, 2012). Additionally, mobilization and passive joint motion appear to influence neural excitability associated to pain, promoting relief from pain (Courtney, Steffen, Fernandez-de-Las-Penas, Kim, & Chmell, 2016).

Today the patellar mobilization and passive tibiofemoral motion procedure is performed manually by physiotherapists who work with clinical rehabilitation or by the patient him/herself upon professional recommendation. The clinical indication for carrying out the mobilization and passive motion procedure may vary from a few days up to several weeks, with daily intervals of 4 to 5 times in routines from 5 to 15 minutes each (Reinold et al., 2006; Tyler & Lung, 2012). The purpose of all this procedure is to improve/maintain the kneecap and/or to decrease the rigidity of the motion. Being a lengthy procedure, and applied during the course of the whole day, the physiotherapist is unable to accompany the patient for the entire rehabilitation process, placing the responsibility upon the individual and his/her family member/carers to carry out the procedures. However, the patients and their carers are not always proficient at performing said procedure, either through concern about handling the recently-operated knee or on which he/she feels pain, or from forgetfulness. Furthermore, self-mobilization appears not to allow the necessary relaxation of the quadriceps musculature, especially the rectus femoris muscle, causing protective contraction. As a consequence, this muscle causes compression of the kneecap and decreases its ability to move.

Since there is a strong dependency on the skill of the professional, or of the patient in carrying out the treatment adequately and with the necessary frequency, this treatment ends up not achieving the desired result, whereby contributing to the post-operation complications referred to.

Accordingly, in order to solve the problems cited above, eliminating the factor of uncertainty in the efficiency of the treatment owing to the dependency on the professional's skill, various semiautomatic and automatic apparatuses have been developed to perform the physiotherapeutic treatments in the knee area, without the need for constant professional supervision.

From prior art, it is possible to cite document EP2114322, which describes a constructive arrangement for a knee immobilizer, with protection accessory for the kneecap; and also the document JP3693368 describes a knee brace that has one or more inflatable cushions to adjustably provide safe and comfortable support for the strap pressed against the leg; and also the document EP2825139 describes a device to protect the knee and the kneecap the enables and accompanies the active motion of the knee, and includes a contact cushion for protecting the kneecap while the knee is moved in flexion and extension.

Today, the most common devices to control and assure immobilization are braces. Besides immobilizing the joint, some braces are also used to enable controlled motion, preventing undesirable amplitudes. For example, there are braces that prevent the knee from being moved at an amplitude greater than 30 degrees, so the device blocks the knee when it reaches this range of motion.

In general, the technologies developed to date focused on eliminating the uncertainties and problems in physiotherapeutic treatment of the knee, caused by the imprecision in performing the treatment, either by the patient or by the professional. Such uncertainty cannot be controlled with efficiency when it depends on the human factor involved.

The challenge in the evolution of these technologies relates to the difficulty in replacing the human operator in the treatment that requires mobilization of the knee joint as a whole, as well as reliable mobilization of the kneecap because it refers to a delicate movement, being in a hard-to-access place and requiring a steady grip, slippage errors can easily occur, which adversely affects the treatment. If we also consider the combination of other motions, the difficulty of correct application of the procedure increases.

It is the object of the present invention to provide a device for performing multidirectional mobilization of the knee joint—both patellofemoral and tibiofemoral—in an automated and non-invasive manner, for post-surgery rehabilitation treatment and conservative (non-surgical) treatment of the knee joint.

According to the invention, the multidirectional mobilizer of the knee is incorporating three motion units: knee flexion and extension motion unit; internal and external rotation motion unit of the knee; and a multidirectional patellar mobilization unit (lower-upper and medial-lateral), an external support for multidirectional patellar mobilizer and a control unit.

The flexion and extension motion unit is comprised of a mechanical and electronic structure on which the leg rests during use thereof. The structure for the leg has at least two joints, one in the proximal region proximal of the femur (region of the hip) and another in the distal region of the femur (knee region), enabling the performance of flexion and extension motion of the leg. The structure has at least two supports to support the leg located at the back region of the thigh and at the back region of the leg (calf). The flexion and extension motion are performed passively from a motor coupled to the longitudinal axis of the unit.

The internal and external rotation motion unit of the knee is comprised of a structure with a support for the leg and a support for the foot region (sole region) coupled to the knee flexion and extension motion unit. The leg support may be the same support for the leg of the flexion and extension motion unit with the addition of rotation on the longitudinal axis and of a leg fastening strap by the back part, enabling the performance of the internal and external rotation motion of the knee. The support for the sole region enables the comfortable positioning of the foot to the structure and the fastening of the motor for performing the rotation motion. The body of the motor is fastened to the structure of the flexion and extension motion unit and its axis is coupled to a trapezoidal screw of the internal and external rotation motion unit.

The multidirectional patellar mobilization unit is comprised of a receptacle on which a retainer and an actuating element are disposed. The retainer is comprised of a rigid or semi-rigid structure that is positioned on the upper part of the knee and is coupled to the flexion and extension motion unit through fastening straps with height adjustment. The actuating element is comprised of a set of inflatable cuffs disposed such that the actuating element comes into contact with the kneecap region, but does not exert pressure thereon whilst not in operation. The set of inflatable cuffs of the actuating element is inflated and emptied according to the programming of the system (detailed ahead) from a fluid pump. When the chambers are driven individually, the actuating element comes into contact with the side, lower and back edges of the kneecap and, from the pressure exerted on the edge, the multidirectional motions (frontal-upper and medial-lateral) are performed. The multidirectional patellar mobilization unit can be used in an integrated manner with the flexion and extension motion unit from the straps and side clips or used independently with the assistance of the support for multidirectional patellar mobilizer.

The support for multidirectional patellar mobilizer is comprised of a single element that enables the coupling of the multidirectional patellar mobilizer in a manner similar to the flexion and extension motion unit from the side clip straps, but without the flexion-extension and rotation motion elements. The support for multidirectional patellar mobilizer enables the leg to be fastened at the suitable knee extension position for performing patellar mobilization. The structure has a support for the leg and thigh, on which the leg is fastened with two straps, one for each region, so as to maintain the leg in the extension position during mobilization.

The control unit is comprised of an electro-electronic and pneumatic system. The electro-electronic system is characterized by performing the control of the operation of the device, in an automated manner and from the commands and parameters added by the user. The following are parts of the electro-electronic system: the activation drivers of the motors for performing flexion, extension and rotation movements; the activation drivers of the fluid pump and valves for performing lower-upper and medial-lateral patellar mobilization motion. The power source and the man-machine interface for controlling the adjustment parameters of the device are also parts of the electro-electronic system. The fluid pumps, the valves, the inflatable cuffs and the pneumatic connections are parts of the pneumatic system.

The description below and accompanying drawings, for example, will clarify the understanding of the object of the present application.

FIG. 1 presents a schematic drawing of the three motion units integrated in perspective.

Figure 2:
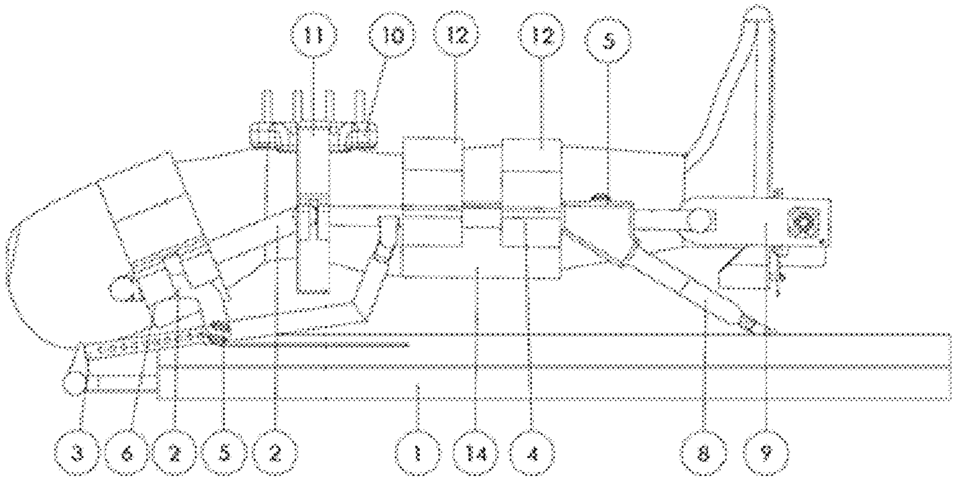

FIG. 2 presents a schematic drawing of the three motion units integrated in side view.

Figure 3:
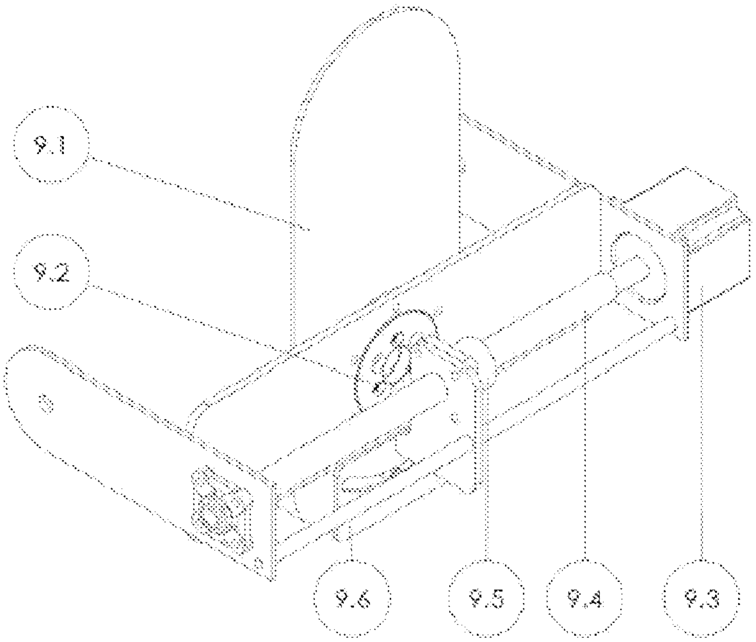

FIG. 3 presents a detailed schematic drawing of the rotation device in perspective.

Figure 4:
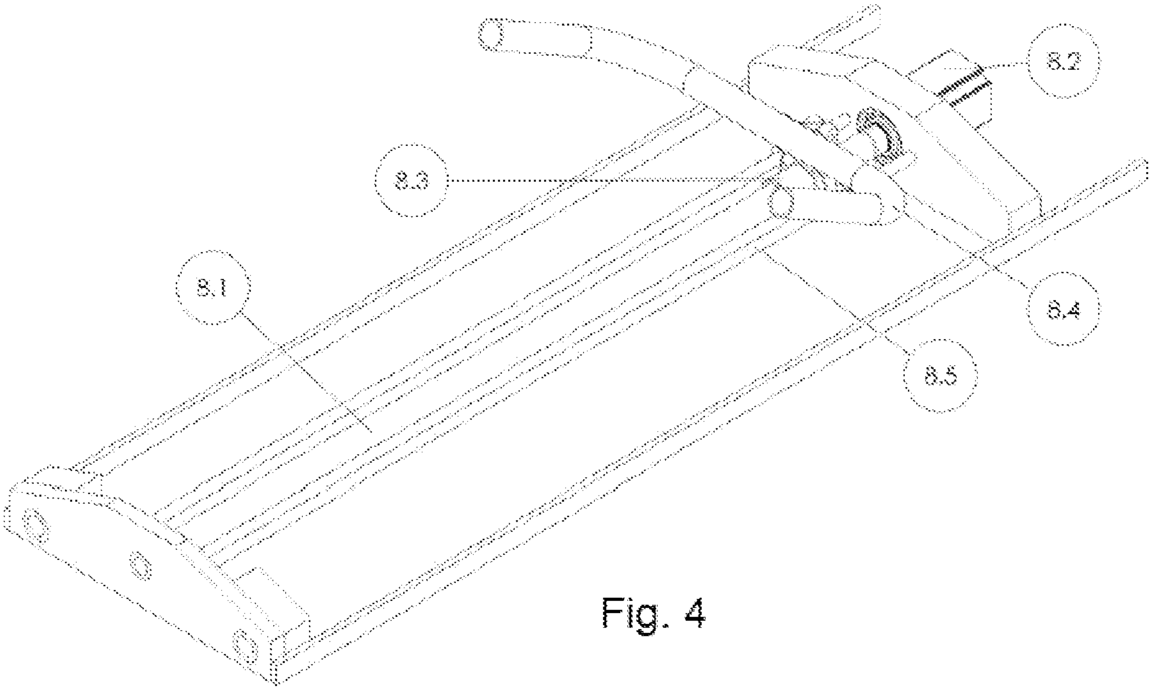

FIG. 4 presents a detailed schematic drawing of the flexion and extension device.

Figure 5:
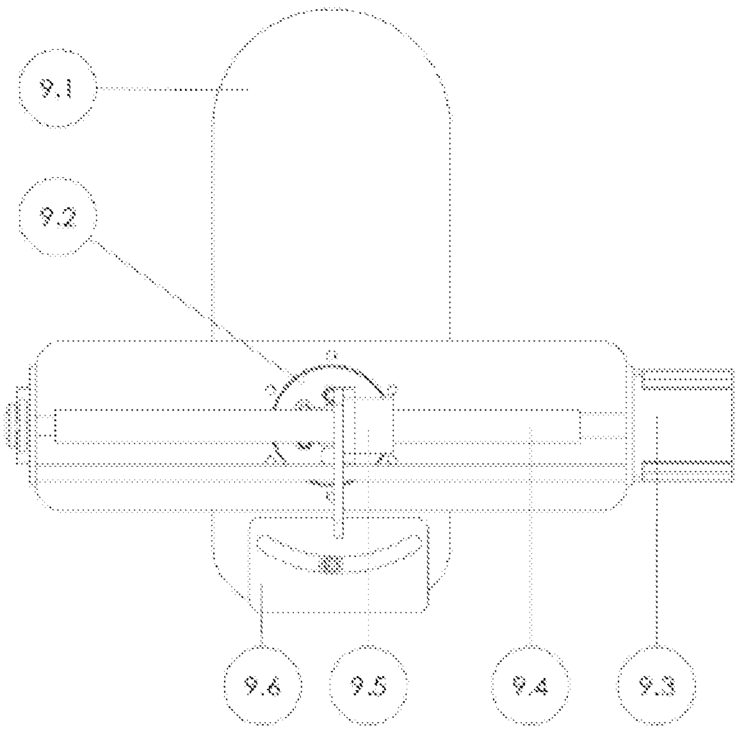

FIG. 5 presents a detailed schematic drawing of the rotation device in side view.

Figure 6:
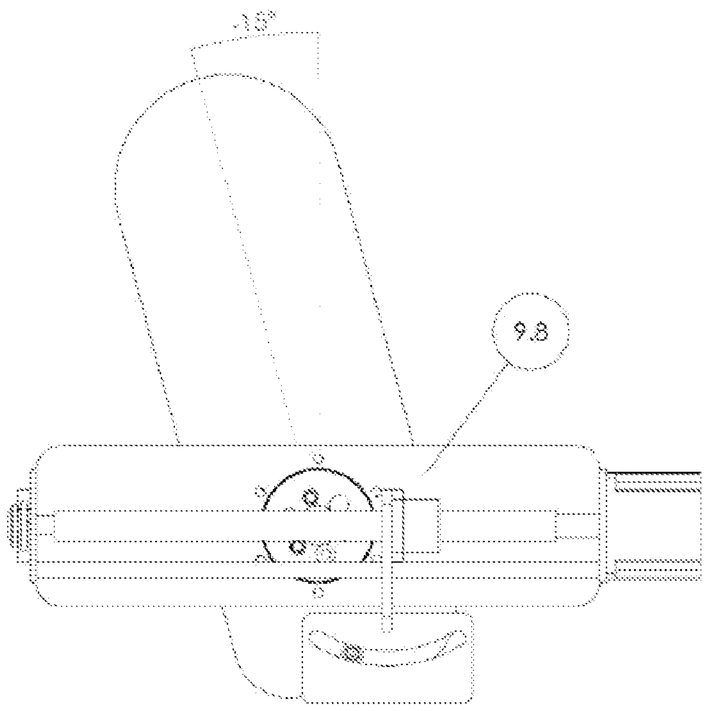

FIG. 6 presents a detailed schematic drawing of the rotation device with internal rotation.

Figure 7:
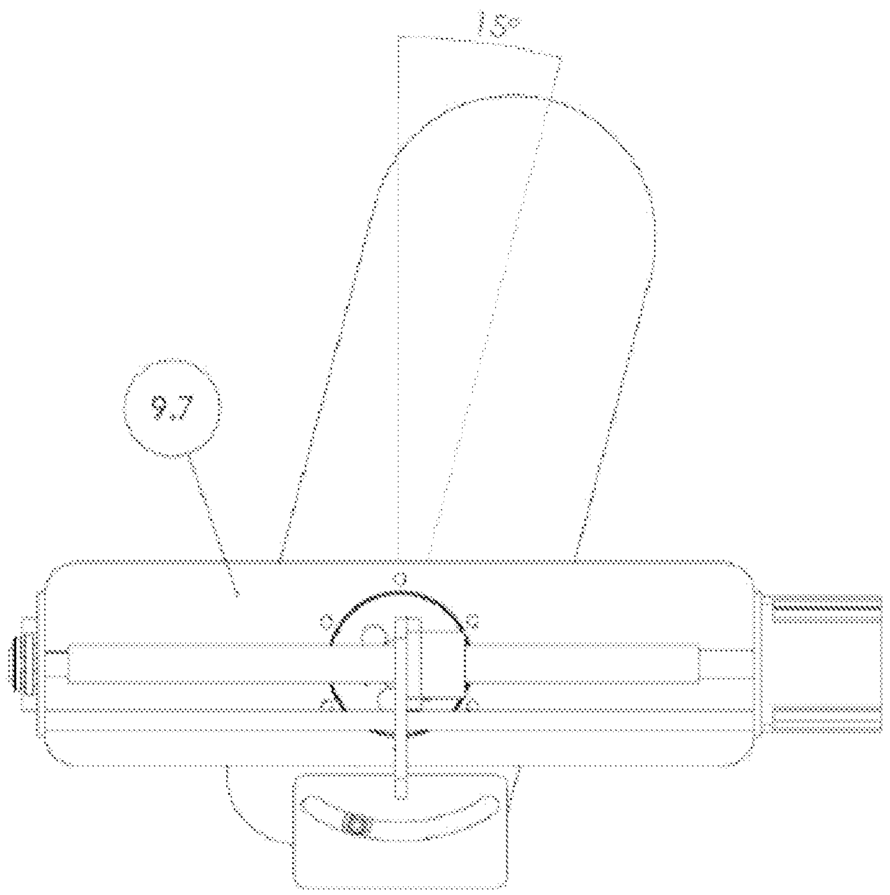

FIG. 7 presents a detailed schematic drawing of the rotation device with external rotation.

Figure 8:
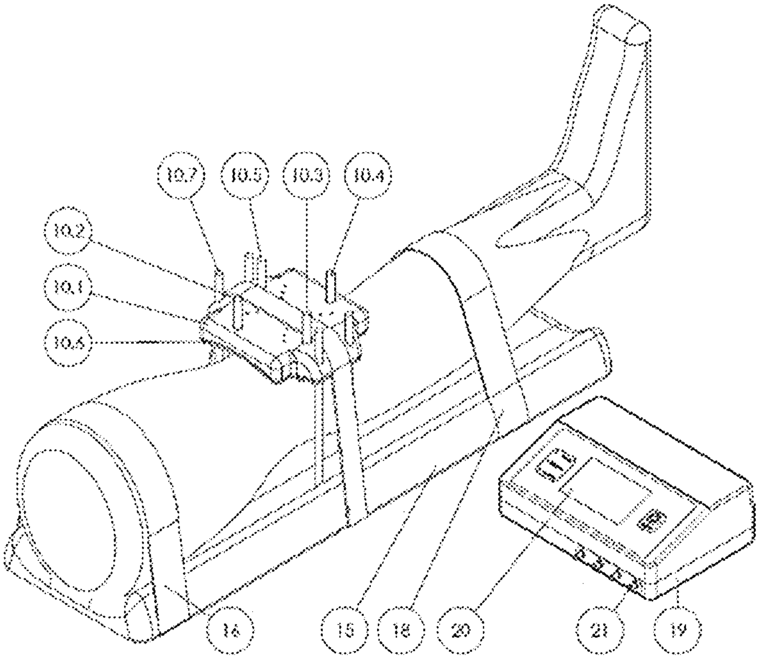

FIG. 8 presents a schematic drawing of the patellar mobilizer and external support for the patellar mobilizer.

Figure 9:
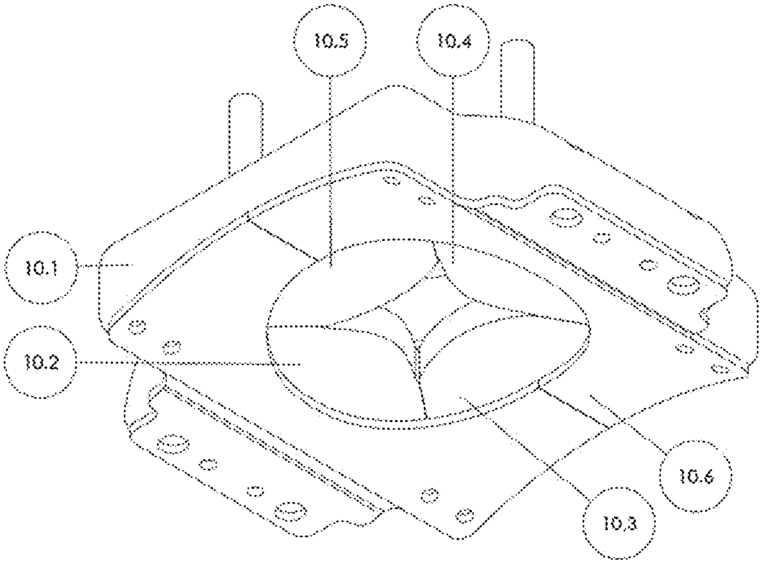

FIG. 9 presents a detailed schematic drawing of the inflatable cuff container.

Figure 10:
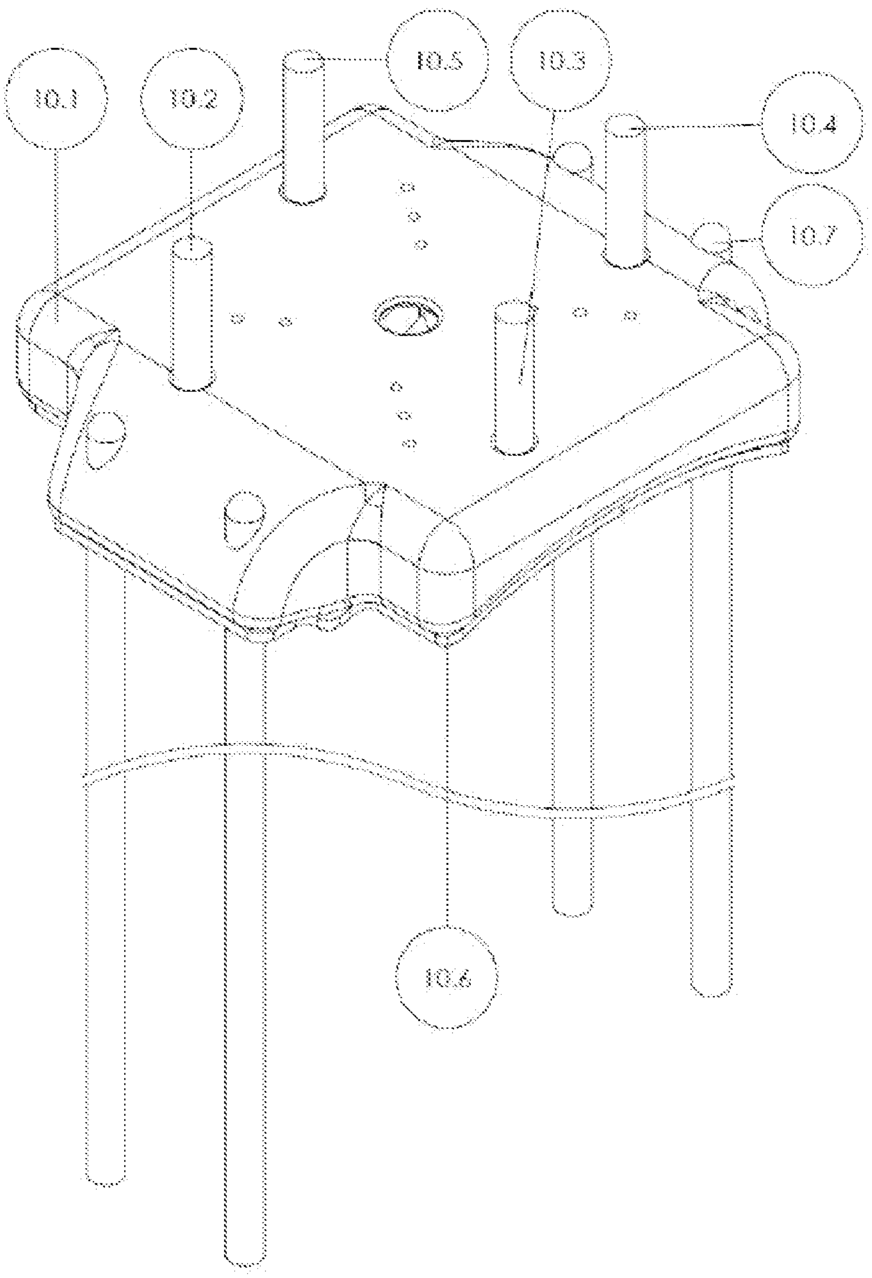

FIG. 10 presents a detailed schematic drawing of the inflatable cuff container with side support rods.

As illustrated in the drawings, the multidirectional patellar mobilization equipment is comprised of three motion units, according to FIG. 1, which are integrated into a single apparatus responsible for synchronizing the motions applied in the specific treatment of the patient. The position of use of the apparatus is compulsorily horizontal, with the base (1) positioned parallel to the horizontal plane, enabling the accommodation of the leg such that the hip remains near the proximal adjustment combination (3) and joint links (2) and that the thigh is supported on the back support of the thigh (6) and the calf is supported on the back support of the leg (14). For due accommodation of the leg and, considering the different anatomies and statures of the users, the distal adjustment combination (4) should be adjusted through the device for adjustment locking (5) so that the sole face is duly supported on the foot support (9.1). On the base (1) there are inserted the electronic and pneumatic control systems needed for the due activation of the electro-mechanical and pneumatic parts of the multidirectional mobilizer of the knee, as well as the man-machine interface through the local display (for example: display touchscreen, alphanumerical, etc.) or remote display (for example: smartphone).

The flexion and extension motion unit (8) is comprised by the base (1) that is common to all the units, on which there are inserted a motor (8.2) coupled to a trapezoidal screw thread (8.1) and a displacement assembly (8.3), the displacement assembly is directed by guides (8.5) and connected to an articulated U-shaped tube (8.4). When the motor (8.2) is driven the trapezoidal screw thread (8.1) transmits the rotation to the displacement assembly (8.3) which moves along the screw, the guides (8.5) restrict the motion of the displacement assembly only in a linear direction, upon moving, the assembly connected to the articulated U-shaped tube (8.4) which is part of a mechanism formed by tubes (3) and (4) and links (2), transfers the motion of one degree of freedom to two degrees of freedom whereby flexing the knee forward and extending it upon return.

The internal and external rotation motion unit (9) of the knee is comprised of the base (1) which provides suitable support for the leg through the back support of the thigh (6), of the back support of the leg (14) and of the foot support (9.1). The foot support has a tightening strap for tibia (12) which is buckled at the distal region of the tibia in order to maintain the tibia in a neutral position relative to the internal-external rotation. The rotation device of the tibia is comprised of the foot support (9.1) coupled to a mobile flange of the turning ring (9.2), which is fastened to one of the plates of the system and a step motor (9.3) coupled to a trapezoidal screw (9.4) that transmits the rotation motion to a displacement assembly (9.5) fastened to the turning guide (9.6). To perform the operation of rotation of the tibia the foot support (9.1) is coupled to the mobile flange of the turning ring (9.2) while the fastened flange of the turning ring (9.2) is fastened on the plate of the system, whereby the foot support turns freely while fastened on the plate. The foot support (9.1) is further connected by a guide pin to a slot on the guide turning plate (9.6) which is fastened to the displacement assembly (9.5), accordingly, when the step motor (9.3) is driven and turns the trapezoidal screw (9.4) displacing the displacement assembly (9.5) the guide pin of the foot support displaces radially inside the slot of the guide plate. In advancing the displacement assembly, the tibia turns internally (counter-clockwise) and upon retreating, it turns externally (clockwise) (9.7 and 9.8).

The multidirectional patellar mobilization unit (10) is comprised of an inflatable cuff container (10.1) which is coupled to the base (1) through the tightening strap (11). In the lower part of the inflatable cuff container (10.1) a set of inflatable cuffs is located, comprised of at least one inflatable cuff. The representation (10.2, 10.3, 10.4, 10.5) shows the combination with four inflatable cuffs distributed in a way that they surround the knee joint. The inflatable cuffs are inserted inside internal containment chambers (10.6) upon containing the cuffs so as to control the direction of the fluid filling in the direction of the desired patellar mobilization (lower-back or medial-lateral). The fluid ducts of the cuffs are positioned laterally to the pneumatic connectors (21), enabling the pneumatic connection with the base (1) through the pneumatic connectors (21).

This constructive form enables the patellar mobilization device to be used individually, that is, a multidirectional patellar mobilization unit (10) can be used in isolation with the assistance of the external support for multidirectional patellar mobilizer (15) which is comprised of the base for leg (18) support and fastening the inflatable cuff container (10.1), side fastening rods (10.7) and tightening straps (11) of the thigh (16) and of the leg (18), besides the an electronic and pneumatic control unit (19) which has a man-machine interface of the system through the local or remote display (20). The inflatable cuff container (10.1) is coupled to the external support for multidirectional patellar mobilizer through the side fastening rods (10.7) that have height adjustment by means of clips, butterflies or the like enabling the use in different anatomies of the knee. The external support for multidirectional patellar mobilizer contains an electronic and pneumatic control unit (19) specific for individualized use of the multidirectional patellar mobilizer. The electronic and pneumatic control unit (19) is connected to the inflatable cuffs (10.2, 10.3, 10.4, 10.5) through the pneumatic connectors (21) through which the flow of fluid enters and leaves the device through the valves and fluid pumps.

The invention claimed is:

1. An equipment for passive motion of a knee joint comprised of three motion units integrated into a single apparatus responsible for synchronizing motions applied in a specific treatment of a patient with dysfunction of a knee;

comprising a motion flexion and extension unit, an internal and external rotation motion unit, a multidirectional patellar mobilization unit mounted on a base and an external support for a multidirectional patellar mobilizer and the base positioned parallel to an horizontal plane, so as to enable accommodation of a leg such that a hip remains near a proximal adjuster and a plurality of joint links arranged in a manner that a thigh is supported on a back support of the thigh and a calf is supported on a back support of the leg and further comprises a distal adjuster adjustable by an adjustment locker as arranged in a manner to enable a face of a sole to be supported on a foot support; the base provides an electronic and pneumatic control unit having a man-machine interface of a system through local or remote display; the motion flexion and extension unit mounted on the base provides a motor coupled to a first trapezoidal thread screw and a first displacement device, the first displacement device is directed by guides and the first displacement device is connected to an articulated U-shaped tube arranged in a manner that when the motor is driven, the first trapezoidal thread screw transmits a rotation to the first displacement device, so that the first displacement device moves along the first trapezoidal thread screw and such that the guides enable a motion of the first displacement device only in a linear direction; an assembly connected to the articulated U-shaped tube which provides a mechanism formed by the proximal adjuster, the distal adjuster and the plurality of joint links, is mounted in a manner that upon moving, transfers a motion of one degree of freedom to two degrees of freedom; and the internal and external rotation motion unit of the knee mounted on the base comprises a tightening strap for a tibia on the foot support disposed such that the tightening strap is buckled to a distal region of the tibia and the foot support provides a mobile flange of a turning ring, which is fastened to one of a plurality of plates of the equipment for passive motion of the knee joint and a step motor coupled to a second trapezoidal screw which transmits a rotation motion to a second displacement device fastened to a turning guide; and the foot support is coupled to a mobile flange of the turning ring and a fastened flange of the turning ring is fastened on one of the plurality of plates of the equipment for passive motion of the knee joint, such that the foot support turns freely while fastened on one of the plurality of plates; and further, the foot support is connected by a guide pin to a slot on the turning guide which is fastened to the second displacement device, such that when the step motor is driven and turns the second trapezoidal screw displacing the second displacement device, the guide pin of the foot support displaces radially inside of the slot of the turning guide, the multidirectional patellar mobilization unit is comprised of an inflatable cuff container which is coupled to the base by the tightening strap and on a lower part of the inflatable cuff container there is disposed a set of inflatable cuffs distributed such that they surround the knee joint and the set of inflatable cuffs are inserted inside internal containment chambers upon containing cuffs such that the internal containment chambers control a direction of a fluid filling and fluid ducts of the set of inflatable cuffs are positioned laterally to pneumatic connectors comprising a pneumatic connection with the base by the pneumatic connectors; and the external support for the multidirectional patellar mobilizer comprised a base for leg support and for fastening the inflatable cuff container, a plurality of side fastening rods and fastening straps of the thigh and straps of the leg, besides the electronic and pneumatic control unit which provides the man-machine interface of the system through the local or remote display and the inflatable cuff container coupled to the external support for the multidirectional patellar mobilizer by the plurality of side fastening rods which provides height adjustment by clips; and the external support for the multidirectional patellar mobilizer provides the electronic and pneumatic control unit connected to the set of inflatable cuffs by the pneumatic connectors.

* * * * *